United States Patent [19]
Demers et al.

[11] Patent Number: 6,105,018
[45] Date of Patent: Aug. 15, 2000

[54] MINIMUM LEAF SPANNING TREE

[75] Inventors: Alan Demers, Boulder Creek; Alan Downing, Fremont, both of Calif.

[73] Assignee: Oracle Corporation, Redwood Shores, Calif.

[21] Appl. No.: 09/049,285

[22] Filed: Mar. 26, 1998

[51] Int. Cl.[7] .................................................. G06F 17/30
[52] U.S. Cl. ..................... 707/2; 707/5; 707/4; 707/3; 707/1
[58] Field of Search .................... 707/2, 5, 4, 3, 707/1

[56] References Cited

U.S. PATENT DOCUMENTS

| | | | |
|---|---|---|---|
| 5,701,467 | 12/1997 | Freeston | 707/100 |
| 5,781,906 | 7/1998 | Aggarwal et al. | 707/102 |
| 6,006,233 | 12/1999 | Schultz | 707/101 |

OTHER PUBLICATIONS

CRC Dictionary of of Computer Science, Engineering and Technology, Mar. 2000.

*Primary Examiner*—Thomas G. Black
*Assistant Examiner*—William Trinh
*Attorney, Agent, or Firm*—McDermott, Will & Emery

[57] ABSTRACT

An efficient set of indexes to cover a plurality of anticipated query types is determined by building a directed acyclic graph whose nodes correspond to anticipated query types. A minimum leaf spanning tree for the equivalent graph is determined by repeatedly finding an augmenting path for a current spanning tree and producing a reduced leaf spanning tree based on the current spanning tree and the augmenting path until an augmenting path can no longer be found. The leaves of the minimum leaf spanning tree indicate which indexes should be built.

26 Claims, 12 Drawing Sheets

| (ROWID) | A | B | C | D |
|---|---|---|---|---|
| 1 | 1 | 1 | 1 | 2 |
| 2 | 3 | 7 | 2 | 8 |
| 3 | 2 | 4 | 3 | 6 |
| 4 | 4 | 2 | 4 | 4 |
| 5 | 7 | 8 | 5 | 1 |

TABLE T1
1000

FIG. 10
(PRIOR ART)

| KEYVALUE | (ROWID) |
|---|---|
| 1,1 | 1 |
| 2,7 | 2 |
| 3,4 | 3 |
| 4,2 | 4 |
| 5,8 | 5 |

INDEX ON C, B
1200

FIG. 12
(PRIOR ART)

MINIMUM LEAF SPANNING TREE

FIELD OF THE INVENTION

The present invention relates to computer database systems and more particularly to efficiently executing a query in a database.

BACKGROUND OF THE INVENTION

In a relational database, information is stored in indexed tables. A user retrieves information from the tables by entering input that is converted to queries by a database application. The database application submits the queries to a database server. In response to a query, the database server accesses the tables specified in the query to determine which information within the tables satisfies the queries. The information that satisfies the queries is then retrieved by the database server and transmitted to the database application and ultimately to the user. Queries may also be internally generated and executed by a database system for performing administrative operations.

For any given database application, the queries must conform to the rules of a particular query language. Most query languages provide users with a variety of ways to specify information to be retrieved. For example, in the Structured Query Language (SQL), the following query requests the retrieval of the information contained in all columns of rows in table T1 in which the value of column a is 2:

Query 1

Select * from T1
  where a=2

Table T1 (1000) is shown in FIG. 10 and comprises four user columns, 1020–1026, and five rows (1030–1038). Table 1000 also has an internal column 1010, or pseudocolumn, referred to as rowid. A table's rowid pseudocolumn is not displayed when the structure of the table is listed. However, the rowid is retrievable by query and uniquely identifies a row in the table. Rowid pseudocolumn 1010 has rowid entries that correspond to rows 1030–1038. Thus, a rowid of 2 for table 1000 specifies row 1032 and no other row of table 1000. Columns 1020–1026 each store data, in this example numbers, and each column has a name. The name of column 1020 is a and the names of columns 1022, 1024, and 1026 are b, c, and d, respectively.

Without special processing, a database server would have to fetch every row of a table and inspect every column named in the where clause to perform the query. Such an approach, however, impairs the overall database system performance because many disk blocks would have to be read. Consequently, many database systems provide indexes to increase the speed of the data retrieval process. A database index is similar to a normal index found at the end of a book, in that both kinds of indexes comprise an ordered list of information accompanied with the location of the information. Values in one or more columns are stored in an index, maintained separately from the actual database table.

In FIG. 11(*a*), index 1100 is an index built on column a of table 1000. Each entry 1130–1138 in index 1100 has a key value 1110 and a rowid 1120. Since the key values are ordered, it can quickly be determined, for example, that the row having a key value of 2 in column a is associated with rowid 3 (see index entry 1132). An index may be implemented in a variety of ways well known in the art, such as with B-trees, depending on the specific performance characteristics desired for the database system. As changes are made to the table upon which an index is built, the index must be updated to reflect the changes.

FIG. 11(*b*) shows a B-tree implementation of index 1100. A B-tree consists of a set of nodes connected in a hierarchical arrangement. A B-tree contains two types of nodes: branch nodes and leaf nodes. Leaf nodes reside at the lowest level of the hierarchy and contain values from the actual column to which the index corresponds. For example, B-tree 1100 is an index for column a 1020 of table 1000 and has leaf nodes 1172 and 1174. Node 1174 is a leaf node that contains a value from column a 1020. Along with the values, leaf nodes store the rowid of the rows that contain the values. For example, in addition to the number 3, leaf node 1172 contains the rowid 2 which corresponds to the row 1032 of table 1000 that contains the number 3 in column 1020. In other words, leaf node 1172 contains index entry 1134, and a leaf node may contain more than one index entry.

All the nodes in B-tree 1100 that are not leaf nodes are branch nodes. Branch nodes contain information that indicates a range of values. In the illustrated B-tree 1100, nodes 1150, 1160, 1162, and 1164 are branch nodes and thus correspond to a range of values. The range of values identified in each branch node is such that all nodes that reside below a given branch node correspond to values that fall within the range of values represented by the branch node. For example, node 1162 is a branch node that corresponds to numbers in the numerical range from three to four. Consequently, nodes 1172 and 1174, which all reside below node 1162 in the hierarchy, correspond to values that fall within the range from 4 to 6. Reference numbers 1170 and 1176 represent connections to other portions of B-tree 1100 that are not shown.

A database server can use index 1100 to process the exemplary query listed above because index 1100 is built on a column referenced in one of the predicates of the where clause. Specifically, the where clause contains the predicate a=2, and index 1100 is built on column a. Not all indexes built upon a table are useful for executing an arbitrary query. For example, the following query may be executed for table T1 1000:

Query 2 select * from T1
  where b=2 and c=4

In this case, using index 1100, built upon column a 1020, does not aid in retrieving data for QUERY 2 because column a is not one of the columns referenced in the where clause. On the other hand, if an index is built upon column b 1022, column c 1024, or both, then the performance of data retrieval operations for QUERY 2 can be improved. In particular, a "multi-column index" may be built on more than one column of a table; for example index 1200, illustrated in FIG. 12, is built upon columns c 1024 and b 1022. The key value of a multi-column index is a concatenation of column values from the table upon which the multi-column index was built. For example, in FIG. 12, the key value for entry 1202 lists a value of 4 taken from column c 1024 of table T1 1000 followed by a value of 2 from column b 1022 of table 1000. This key value identifies row 1036 by means of rowid 4. Thus, multi-column index 1200 can be used in processing QUERY 2, because it was built upon both columns referenced in the query.

One property of a multi-column index is that it improves data processing for "point lookup" queries referencing the first ($n \geq 1$) columns upon which the multi-column index is built. In contrast to a "range lookup," a point lookup identifies a row or set of rows by specifying a specific value for one or more columns. Thus, the search criteria associated with point lookups includes an equality "=" operator, but not an inequality operator (e.g. a greater than ">" operator) which identifies a range of rows. In the example, since multi-column index 1200 is built upon column c 1024 and column b 1022 in that order, point lookups referring only to column c 1024 can profitably use multi-column index 1200. The following QUERY 3 is an example of query that can use a point lookup on multi-column index 1200:

Query 3
select * from T1
 where c=2

In certain circumstances, it may be known to a relational database system that there are particular combinations of columns of a table that are most likely to be referenced in queries. For example, it may be known for Table T1 1000 that QUERIES 1, 2, and 3, are fairly common operations, referencing combinations of columns {a}, {b, }, and {c}, respectively. In addition, it may also be known that combinations of columns {a, b, c} and {a, b, c, d} are commonly used in queries. Conversely, many other combinations of columns are rarely referenced in queries received by the database. In the example, it may be a relatively rare occurrence that only column d is referenced in queries.

Since indexes are useful in improving the processing performance of a relational database, one approach for providing indexes would be to provide an index built on every combination of table columns frequently referenced in queries received by the database. In the example presented above, this approach would call for an index to be created for each of the five frequent combinations of columns, viz. {a}, {c}, {b, c}, {a, b, c} and {a, b, c, d}.

However, building and maintaining an index is costly. For example, each time a row is added to Table T1 1000, an entry corresponding to the added row must be added to each index built upon the table. Thus, if there are five indexes built upon table T1 1000, then the five indexes have to be updated each time a row is added to the table. Likewise, each index built upon a table must be updated each time a row is deleted from the table or a column value referenced by an index is modified.

Since a query referencing a first combination of columns can use an index built upon a second combination of columns if the first combination is a prefix of the second combination, it is advantageous to use the same index for a query referencing the first combination of columns and for a query referencing the second combination of columns. For example, QUERY 2 and QUERY 3, referencing column combinations {b, c} and {c}, respectively, can use index 1200, which was built upon columns c and b. Both queries realize the performance benefits of using an index, but the maintenance costs of a second index are eliminated.

Failing to create an index than can handle an anticipated query type results in increased access and retrieval costs of executing the query. On the other hand, creating a separate index to handle each respective anticipated query type may result in excessive index maintenance costs, when it is possible for two queries to share an index.

SUMMARY OF THE INVENTION

What is needed is a technique for determining a set of indexes for a table that can efficiently handle a group of anticipated query types, each query type referencing a respective combination of the table's columns.

This and other needs are met by the present invention in which an equivalent graph is built based on the combination of the table's columns. A minimum leaf spanning tree for the graph is found and indexes are created for the table based on the minimum leaf spanning tree. The leaves of a spanning tree of the equivalent graph correspond to a set of indexes that can cover the anticipated query types, and minimizing the number of leaves in such a spanning tree results in an efficient set of indexes.

One aspect of the invention is a computer-implemented method and a computer-readable medium bearing instructions arranged to cause one or more processors to perform a method of creating one or more indexes for a body of data arranged in columns, which indexes are used to support query types referencing respective combinations of one or columns. This method comprises the steps of: building a graph based on the respective combinations; finding a minimum leaf spanning tree for the graph; and creating one or more indexes based on the minimum leaf spanning tree.

Another aspect of the invention is a computer-implemented method and a computer-readable medium bearing instructions for finding a minimum leaf spanning tree for a directed acyclic graph (DAG) by finding an initial spanning tree for the DAG and establishing the initial spanning tree as a current spanning tree. If an augmenting path is determined to exist for the current spanning tree, then a new spanning tree having fewer leaves than the current spanning tree is produced based on the augmenting path and established as the current spanning tree. The steps of finding an augmenting path and producing a new spanning tree with a reduced number of leaves are repeatedly performed until an augmenting path can no longer be found. The current spanning tree at the end of this loop is established as the minimum leaf spanning tree.

Additional objects, advantages, and novel features of the present invention will be set forth in part in the description that follows, and in part, will become apparent upon examination or may be learned by practice of the invention. The objects and advantages of the invention may be realized and obtained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7(*b*) illustrates a new spanning tree related to the spanning tree and augmenting path shown in FIG. 7(*a*) that has a fewer number of leaves;

FIG. 10 depicts an exemplary table;

FIG. 12 depicts a multicolumn index built upon the table shown in FIG. 10.

DESCRIPTION OF THE PREFERRED EMBODIMENT

A method and apparatus are described for creating one or more indexes for a body of data arranged in columns to support a plurality of query types, each of which referencing a respective combination of one or more of said columns. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
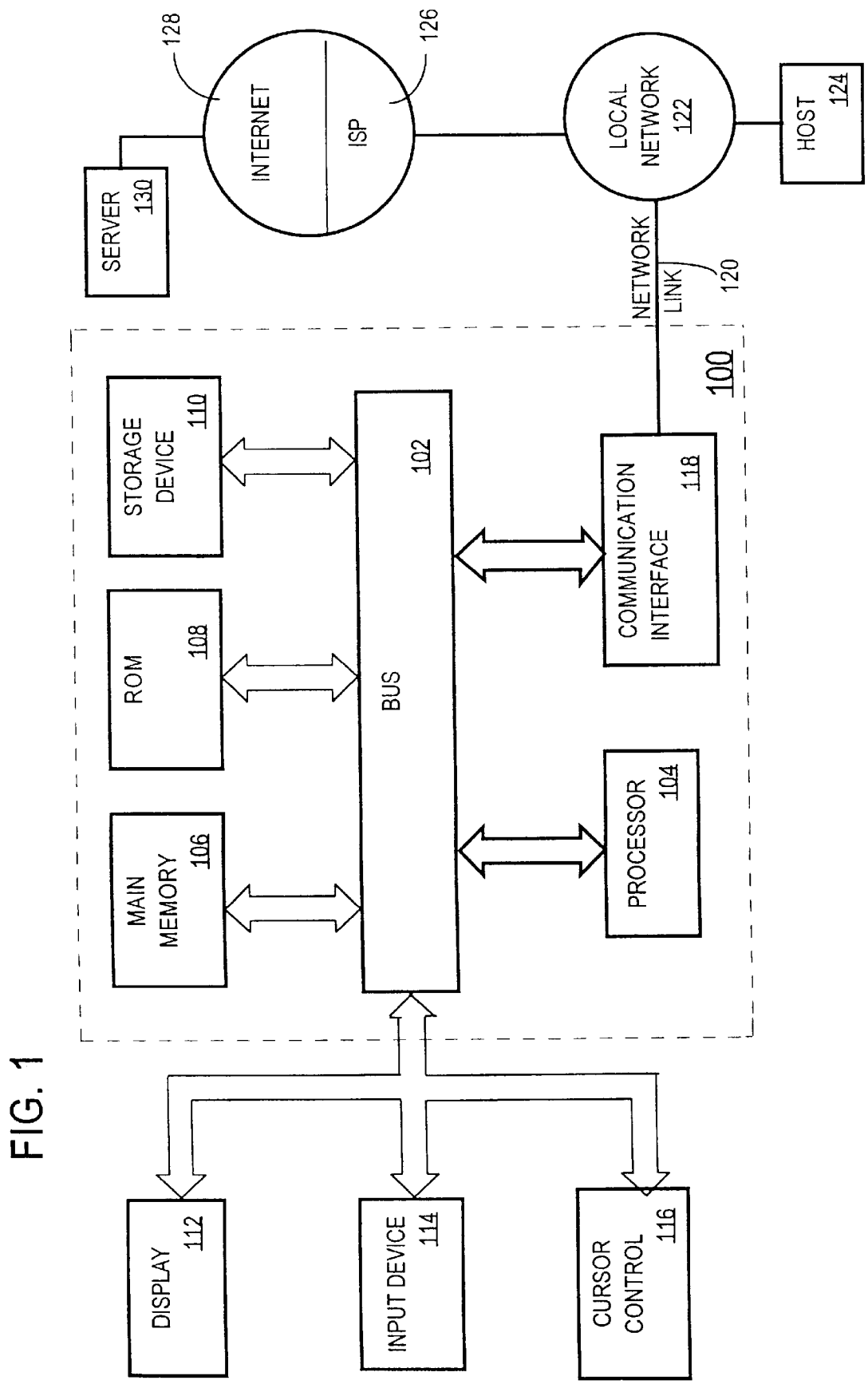
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for creating an efficient set of indexes. According to one embodiment of the invention, creating an efficient set of indexes is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, or example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network, now commonly 395 referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for creating an efficient set of indexes as described herein.

The received code may be executed by processor 104 as it is received, and/or stored in storage device 110, or other non-volatile storage for later execution. In this manner, computer system 100 may obtain application code in the form of a carrier wave.

Representing Relationships Between Column Combinations

The relationships between the column combinations referenced by anticipated query types can be expressed in the form of a directed acyclic graph (DAG). A DAG is a data structure comprising nodes connected by edges, in which relationships between nodes are expressed by edges directed from one node in the graph to another node in the graph. The term "acyclic" means that the edges do not form loops in the graph; thus, travelling from node to node in an acyclic graph via directed edges would eventually terminate in a node having no edge emanating therefrom.

Figure 2:
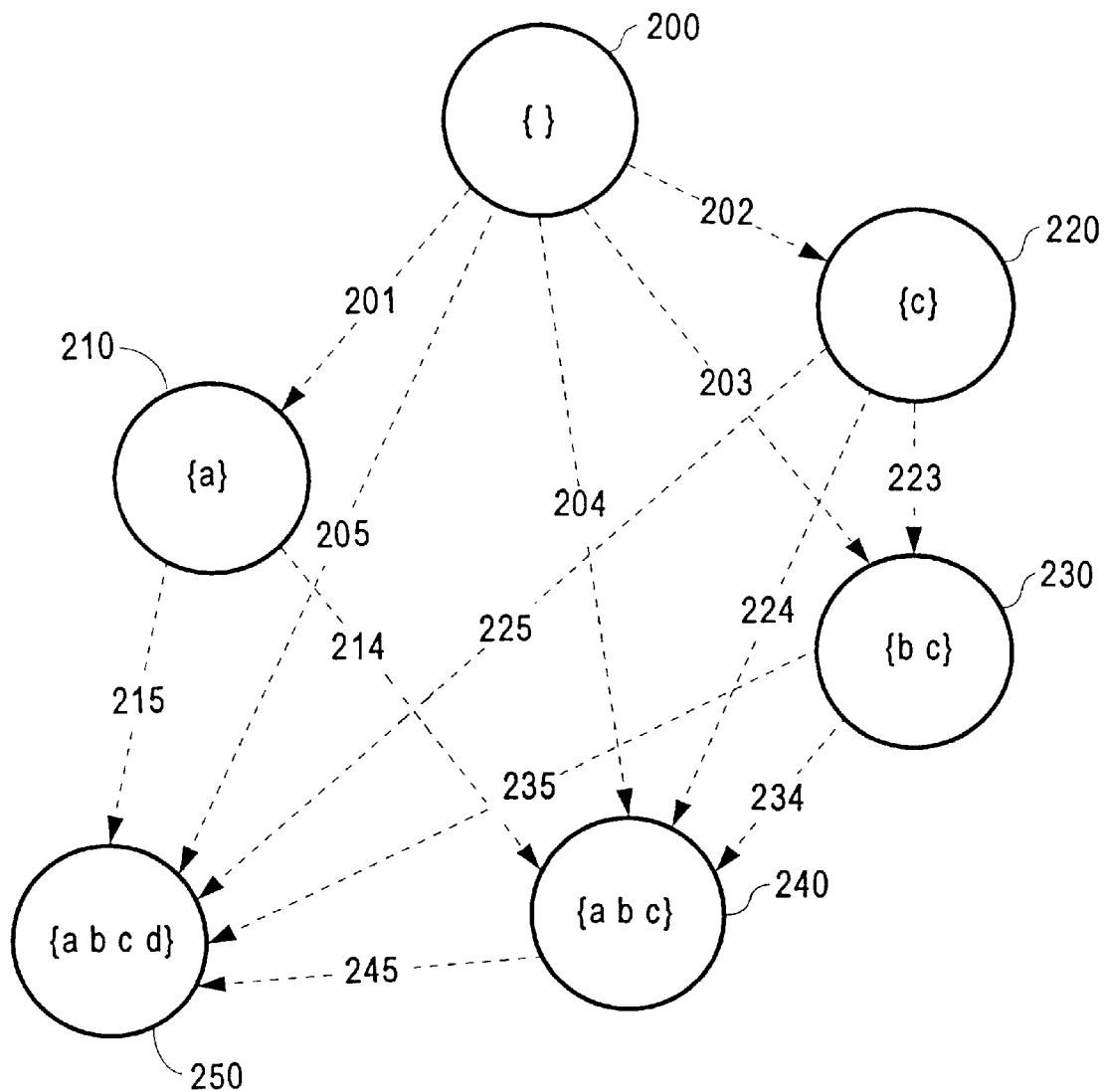
FIG. 2 depicts a directed, acyclic graph representing prefix relationships for an exemplary combination of columns according to an embodiment of the present invention.

Recall that if a first combination of columns is a prefix of a second combination of columns, then a query referencing the first column combination can advantageously use for point lookups an index built upon the columns of the second combination of columns. For example, a query referencing column combination {c} can advantageously use an index built upon columns c and b for point lookups, which is one of the indexes specified by column combination {b, c}. Thus, the column combination {b, c}, of which column combination {c} is a subset, specifies at least one index that column combination {c} can potentially be shared. This relationship may be expressed generally within a DAG by a first node representing a first column combination, a second node representing a second column combination, of which the first column combination is a subset, and an edge directed from the first node to the second node. The exemplary relationship between column combinations {c} and {b, c} can be represented in a DAG by a first node representing column combination {c}, a second node representing column combination {b, c}, and an edge directed from the first node to the second node. As another example, FIG. 2 illustrates a DAG that expresses the relationships between the following combination of columns: {a}, {c}, {b, c}, {a, b, c}, and {a, b, c, d}, corresponding to nodes 210, 220, 230, 240, and 250, respectively.

Node 210 represents column combination {a} and has two directed edges 214 and 215 emanating therefrom. Since a query referencing column combination {a} can use an index built upon columns a, b, and c (corresponding to node 240), there is a directed edge 214 from node 210 to node 240. Likewise, since a query referencing column combination {a} can use an index built upon columns a, b, c, and d (corresponding to node 250), there is a directed edge 215 from node 210 to node 250. There is no edge directed from node 210 to either node 220 or 230, because a query referencing column combination {a} cannot advantageously use for point lookups an index built upon either column combination {c} or {b, c}, respectively.

Node 220 represents column combination {c} and has three directed edges 223, 224, and 225 emanating therefrom. Since a query referencing column combination {c} can use indexes built upon any of column combinations {b, c}, {a, b, c}, and {a, b, c, d}, corresponding to nodes 230, 240, and 250, respectively, the directed edges 223, 224, and 225 point to nodes 230, 240, and 250, respectively. There is no edge directed from node 220 to node 210, because a query referencing column combination {c} cannot advantageously use for point lookups an index built upon column combination {a}.

Node 230 represents column combination {b, c} and has two directed edges 234 and 235 emanating therefrom. Since a query referencing column combination {b, c} can use indexes built upon either of column combinations {a, b, c} and {a, b, c, d}, corresponding to nodes 240, and 250 respectively, the directed edges 234 and 235 point to nodes 240 and 250, respectively. There is no edge directed from node 230 to either of nodes 210 or 220, because a query referencing column combination {b, c} cannot advantageously use for point lookups an index built upon either column combination {a} or {c}, respectively.

Node 240 represents column combination {a, b, c} and has one directed edge 245 emanating therefrom. Since a query referencing column combination {a, b, c} can use an index built upon column combination {a, b, c, d}, corresponding to node 250, the directed edge 245 points to node 250. There is no edge directed from node 240 to any of nodes 210, 220, and 230, because a query referencing column combination {a, b, c} cannot advantageously use for point lookups an index built upon any of column combination {a}, {c}, and {b, c}, respectively.

Node 250 represents column combination {a, b, c, d} and has no directed edges emanating therefrom. There is no edge directed from node 250 to any of nodes 210, 220, 230, and 240, because a query referencing column combination {a, b, c, d} cannot advantageously use for point lookups an index built upon any of column combination {a}, {c}, {b, c}, and {a, b, c} respectively.

Node 200 represents an empty column combination { }, which is trivially a prefix of every other column combination, viz. {a}, {c}, {b, c}, {a, b, c}, and {a, b, c, d}, corresponding to nodes 210, 220, 230, 240, and 250, respectively. Accordingly, node 200 has edges 201, 202, 203, 204, and 205 directed to nodes 210, 220, 230, 240, and 250, respectively. However, since none of the other column combinations is a prefix of the empty column combination { }, no other node has an edge directed therefrom to node 200.

A "rooted DAG" is a DAG that has "a root node" from which every other node is reachable, and, by acyclicity, the root node is unique and has no entering edges. Since node 200 can reach every other node, but no other node can reach node 200, the addition of node 200 creates a rooted DAG.

A Spanning Tree of a Graph

A tree is a collection of elements in which one of the elements is designated as a "root" and the remaining elements, if any, are partitioned into one or more subtrees. Since this definition of a tree is recursive, one of the elements of the subtree is also designated as a root for the subtree and the remaining elements of the subtree, if any, are further partitioned into one or more subtrees. The root of a tree is the "parent" of the root of each constituent subtree; conversely, the root of each subtree is a "child" of the root of the encompassing tree. If a tree (or subtree) consists of only one element, that element is termed a "leaf" element. Thus, a leaf element is not a parent of any other element in the tree.

Elements of a tree can be represented as nodes of a DAG, and the parent-child relationship between the elements can be represented as directed edges in a DAG. Thus, a tree is a kind of a DAG. A spanning tree of a rooted DAG is a tree constructed from the graph using, or "spanning," all the nodes of the graph. Since edges of a DAG are directed, a spanning tree of a root DAG consists of the nodes of the DAG as elements and uses the root node of the DAG as the root of the spanning tree. A spanning tree typically has fewer edges than the graph it spans. For example, a node in a DAG may be the destination of two or more edges, but only one of those edges would be in any one spanning tree of the graph. In general, a DAG can have more edges than nodes, but a spanning tree has exactly one fewer edge than nodes. For example, the DAG depicted in FIG. 2 has thirteen edges for six nodes, but spanning trees of the DAG contain only five edges.

Figure 3:
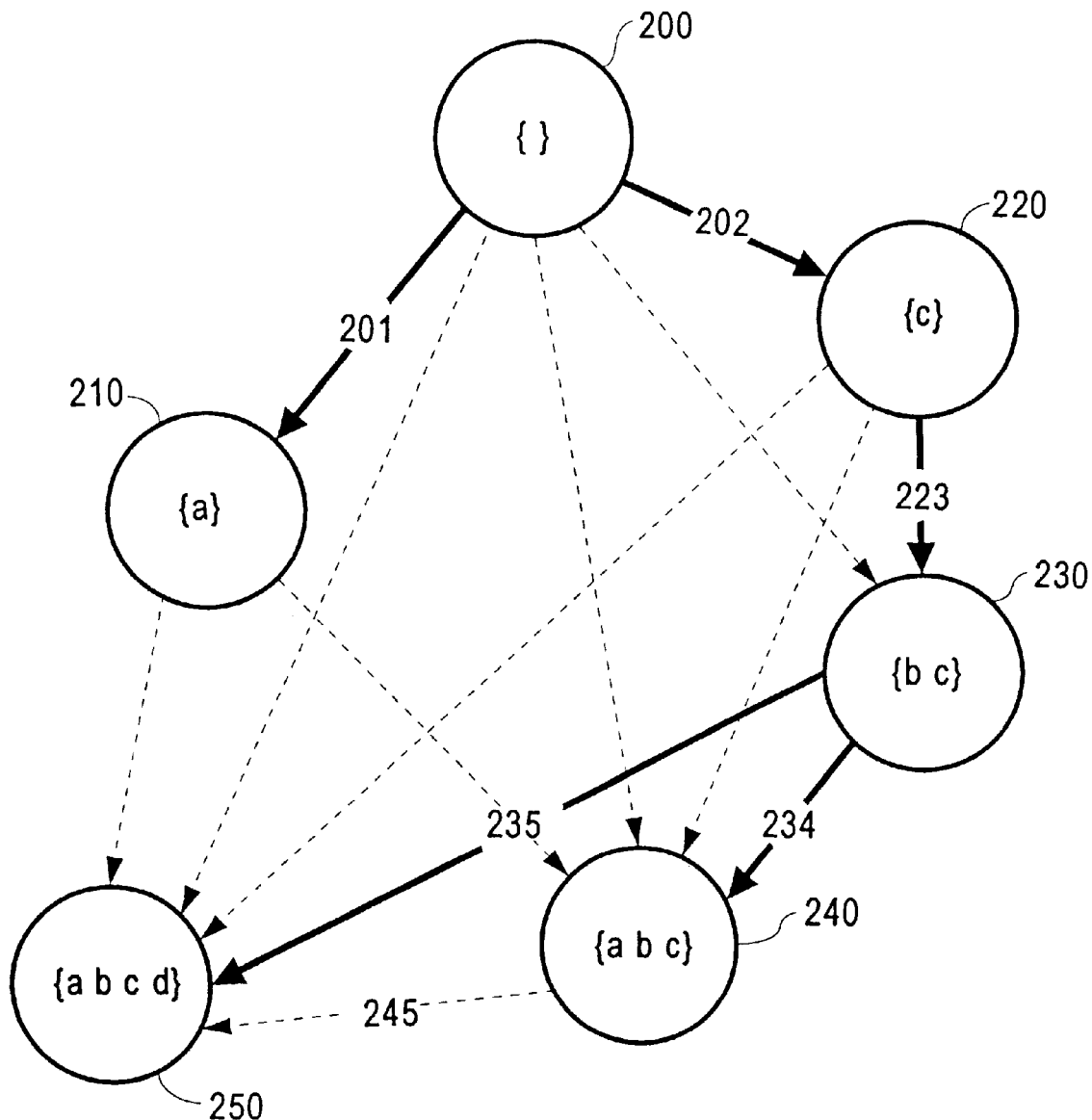
FIG. 3 depicts a spanning tree of the graph shown in FIG. 2.

FIG. 3 depicts an exemplary spanning tree for the DAG illustrated in FIG. 2, which represents the relationships between the exemplary combinations of columns. The edges of the DAG that belong to the exemplary spanning tree are depicted as solid arrows. For example, edge 201 from node 200 to node 210 is shown as a solid arrow and belongs to the exemplary spanning tree. The other edges in the spanning tree include edge 202 from node 200 to node 220, edge 223 from node 220 to node 230, edge 234 from node 230 to node 240, and edge 235 from node 230 to node 250. Referring again to FIG. 3, edges belonging to the DAG that are not in the spanning tree are depicted by a dashed arrow. For example, edge 245 from node 240 to node 250 is shown by a dashed arrow and is not in the exemplary spanning tree. There are five edges in the spanning tree for six nodes of the DAG.

A leaf of a spanning tree is not a parent of any other node in the spanning tree. In other words, a leaf node does not have any edges directed from itself in the spanning tree. Referring again to FIG. 3, node 250 is a leaf node in the exemplary spanning tree because there are no edges emanating therefrom. Node 240 is also a leaf node of the exemplary spanning tree, because the only edge emanating therefrom, namely edge 245 from node 240 to node 250, is not in the exemplary spanning tree. Node 220, however, is not a leaf node of the exemplary spanning tree, because node 220 has an edge 223 from node 220 to node 230 that is in the exemplary spanning tree and depicted with a solid arrow.

Conventional techniques such as a depth-first search or breadth-first search exist for finding a spanning tree for a DAG. A depth-first search is typically implemented by a recursive subroutine in which edges are successively followed from node to node until a leaf node is reached. When a leaf node is reached, the depth-first search backs up and checks previous nodes for additional edges to as-yet-unvisited nodes to add to the initial spanning tree.

For example, referring back to FIG. 2, root node 200 has five exiting edges 201, 202, 203, 204, and 205. Among the edges 201, 202, 203, 204, and 205, a depth-first search may chose and traverse edge 202 to reach node 220, which is the source for nodes 223, 224, and 225. Subsequently, the depth-first search may traverse edge 223 to reach node 230. At node 230, edge 235 may be traversed to reach node 250, which lacks an edge emanating therefrom. Accordingly, the depth-first search backs up a level to node 230 and selects a remaining edge, namely 234, to traverse, reaching node 240. Although node 240 has an edge 245 emanating to node 250, node 250 has already been visited by the depth-first search, so that the depth-first search returns to node 230. Since all destination nodes from node 230, viz. nodes 240 and 250, have also been visited, the depth-first search returns back to node 220 and thence to root node 200. At this point, the depth-first search traverses edge 201 to reach node 210, since edges 203, 204, and 205 point to visited nodes 230, 240, and 250, respectively.

This exemplary depth-first search finds an initial spanning tree comprising edges 201, 202, 223, 234, and 235 and illustrated in FIG. 3. The particular spanning tree found by a depth-first search is typically dependent on the particular order in which edges from a node are consulted or stored in a data structure.

Correspondence Between Spanning Tree Leaves and Indexes

The leaves of a spanning tree of a graph representing subset relationships between combinations of columns correspond to the set of indexes that can cover all the anticipated queries. For example, the spanning tree depicted in FIG. 3 has three leaves: node 210 representing column combination {a}, node 240 representing column combination {a, b, c}, and node 250 representing column combination {a, b, c, d}. Accordingly, the exemplary spanning tree indicates that three indexes may be built upon the corresponding column combinations in order to support all the exemplary anticipated query types. In the example, since node 210 representing column combination {a} is a leaf node in the spanning tree, the spanning tree indicates that an index may be built upon column a.

For indexes built on a plurality of columns, i.e., multi-column indexes, the order of columns is significant. More specifically, a multi-column index is built having the prefixed columns placed before non-prefixed columns. In other words, those columns specified in the ancestor nodes of a leaf node in the spanning tree come before those columns specified only in the leaf node. In the example, leaf node 240 represents column combination {a, b, c} and has node 230 representing column combination {b, c} as a parent and thence node 220 representing column combination {c}. Thus, the multi-column index corresponding to node 240 is built on column c (specified in node 220), column b (specified in node 230), and then column a (specified in node 240). Leaf node 250 includes two columns not specified in any ultimate parent node, viz. columns a and column d. In this case, the order of non-prefixed columns is immaterial for building an index; thus, either an index on columns c, b, a, and d or on columns c, b, d, and a may be built.

In the example, the three indexes, a first index built on column a, a second index built on columns c, b, and a, and a third index built on columns c, b, d, and a, can cover the exemplary anticipated query types referencing column combinations {a}, {c}, {b, c}, {a, b, c}, and {a, b, c, d}. More specifically, a query referencing column combination {a} can use the first index built on column a. The queries referencing column combinations {c} and {b, c} can use either the second index built on columns c, b, and a, or the third index built on columns c, b, d, and a. The query referencing column combination {a, b, c} can use the second index built on columns c, b, and a. Finally, the query referencing column combination {a, b, c, d} can use the third index built on columns c, b, d, and a.

A Minimum Leaf Spanning Tree

A minimum leaf spanning tree of a graph is a spanning tree of the graph such that no other spanning tree of the graph has a fewer number of leaves than the minimum leaf spanning tree. In other words, the minimum leaf spanning tree of the graph has the fewest possible, or minimum, number of leaves. Moreover, a plurality of minimum leaf spanning trees can exist for a given DAG.

A minimum leaf spanning tree differs conceptually from a conventional "minimum spanning tree," which minimizes the aggregate weight of edges within a graph. For clarity, such conventional minimum spanning trees are termed herein as "minimum edge-weight spanning trees." Since all spanning trees of a graph have the same number of edges, one less than the number of nodes, minimum edge-weight spanning trees are most meaningful for graphs that have weighted edges. There are a variety of well-known techniques for finding minimum edge-weight spanning trees, for example, Kruskal's algorithm, Prim's algorithm, and Boruvka's algorithm, none of which, however, are designed to find a minimum leafspanning tree. A minimum leaf spanning tree, on the other hand, is a spanning tree that has a minimal number of leaves without consideration of weights of the edges. Thus, a minimum leaf spanning tree is well defined even for graph whose edges are not assigned weights.

As mentioned hereinabove, there is a need for determining a minimal set of indexes for a table that can efficiently handle a group of anticipated query types, each query type referencing a respective combination of the table's columns. Since the leaves of a spanning tree of a graph representing the relationships between the column combinations indicate indexes that can cover all the anticipated query types and since for any set of n indexes there is a spanning tree having at most n leaves, the leaves of a minimal spanning tree indicate a minimal set of indexes that can efficiently handle the anticipated query types. Accordingly, one embodiment of the present invention meets this need by performing the steps illustrated in FIG. 4.

Figure 4:
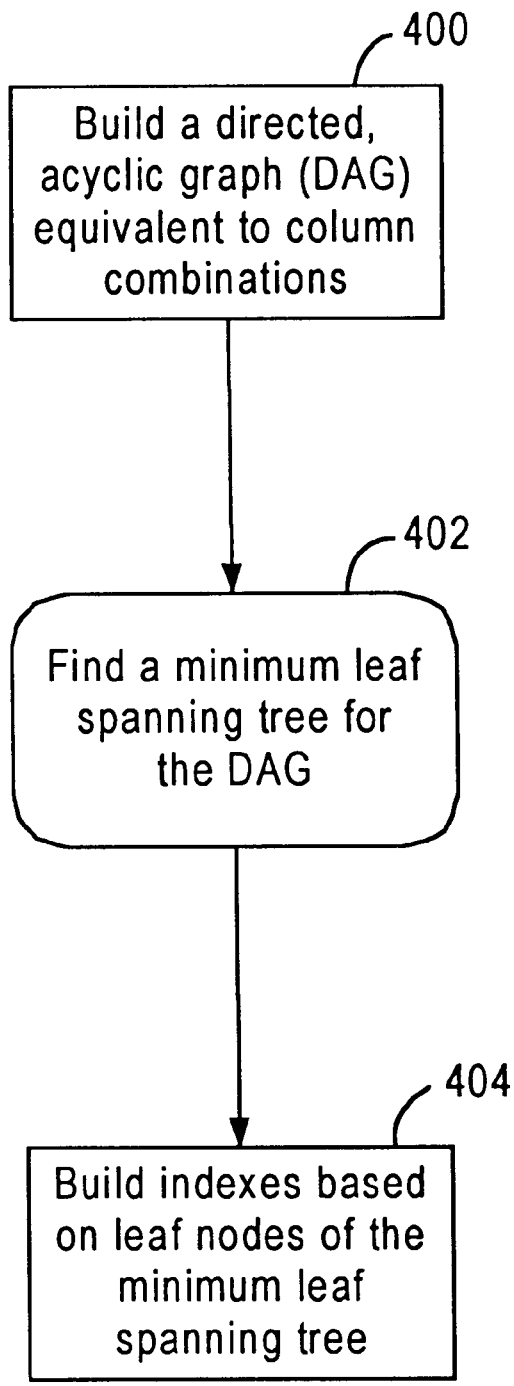
FIG. 4 is a flowchart illustrating steps of finding an efficient set of indexes according to an embodiment of the present invention.

Referring to FIG. 4, a directed acyclic graph (DAG) equivalent to the anticipated column combinations (step 400) is built. A minimum leaf spanning tree is found for the DAG (step 402). A group of indexes is then built based on column combinations associated with the leaves of the minimum leaf spanning tree (step 406). Each of these steps shall be described in greater detail hereinafter.

Building an Equivalent Graph

Referring to step 400 in FIG. 4, a directed, acyclic graph (DAG) equivalent to the pattern of anticipated query types is built. In particular, the nodes of the DAG correspond to the respective column combinations, and the directed edges correspond to a subset relationship existing between column combinations. Moreover, the DAG is built with a root node that can reach every other node in the DAG. More formally, the nodes of such a DAG are { } and each column combination $n_i$, and the edges of the DAG are { }→$n_j$ for all j and $n_{i \to nj}$ if and only if $n_i \subseteq n_j$. For the working example of anticipated query types referencing column combinations {a}, {c}, {b, c}, {a, b, c}, and {a, b, c, d}, such an equivalent DAG is illustrated in FIG. 2, as described in more detail hereinbelow.

There is a variety of techniques and data structures for implementing a directed, acyclic graph, but the present invention is not limited to any particular technique or data structure. An "object-based" approach defines an object (e.g. a structure, record, instance of an abstract data type, or other equivalent construct depending on the programming language) to hold information for each vertex. Edges in an object-based approach are implemented by another object or equivalent construct, which includes a reference (e.g pointers, cursors, indexes, addresses, and the like), to the vertices they connect. In an adjacency list implementation, the edges that come from a vertex are implemented as a collection of references to the respective vertices the edges connect. An incidence list combines the object-based approach and the adjacency list approach, in which each vertex object includes a linked list of edge objects pointing to vertices.

Figure 5:
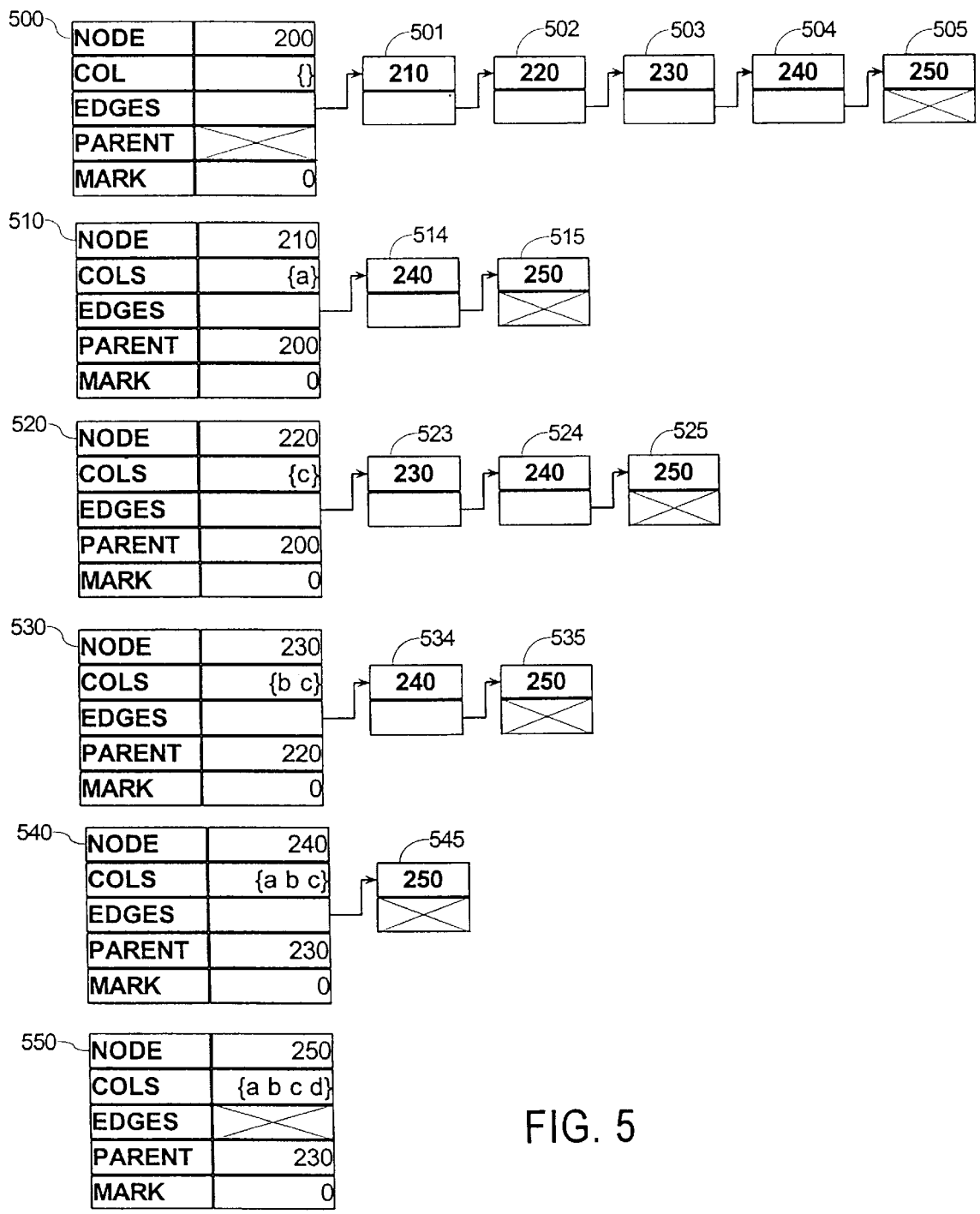
FIG. 5 depicts a data structure that can be used to implement the graph and spanning tree shown in FIG. 3.

An incident list representation is depicted in FIG. 5 for the DAG in the working example. Vertex object 500 contains data for vertex 200 and may include the following fields: an optional NODE field to hold an identifier of the vertex (200), a COL field for the column combination represented by the node, a linked list EDGES of edge objects 501, 502, 503, 504, and 505, and PARENT field to indicate the parent node in a spanning tree for the graph. As described in more detail herein below, a MARK field is used to keep track of whether the node has been "visited" within a pass. Each edge object 501–505 contains a reference to another vertex and a link to the next edge in the list. For example, the reference in edge object 501 is "210" indicating vertex 210 of the graph. In FIG. 5, the reference is a value or "cursor" of the identifier for the associated vertex, however, other implementations may employ a pointer to the associated vertex object, such as a virtual address of the start of the associated vertex object.

Referring again to FIG. 5, vertex object 510 represents vertex 210 of the graph (NODE field) and has a linked list of edge objects containing edge objects 514 and 515, which refer to vertex objects 540 and 550, respectively. Vertex object 520 represents vertex 220 of the graph (NODE field) and has a linked list of edge objects containing edge objects 523, 524 and 525, which refer to vertex objects 530, 540 and 550, respectively. Vertex object 530 represents vertex 230 of the graph (NODE field) and has a linked list of edge objects containing edge objects 534 and 535, which refer to vertex objects 540 and 550, respectively. Vertex object 540 represents vertex 240 of the graph NODE field) and has a linked list of edge objects containing edge object 545, which refers to vertex object 550. Finally, vertex object 550 represent vertex 250 of the graph (NODE field) and has a null linked list of edge objects.

Other approaches include an "adjacency matrix" in which cells of a square matrix having rows and columns indexed by vertices indicate whether the vertices for the row and column are connected. Another matrix is an "incidence matrix" has rows indexed by vertices and columns indexed by edges, in which each cell in the matrix indicates whether the vertex and the edge are incident. Other techniques can be used to implement a DAG equivalent to the pattern of column combinations referenced by anticipated query types.

A spanning tree of a graph can be implemented by a separate data structure that includes pointers to the vertex objects or, preferably, within the same data structure that implements the graph and reusing the vertex objects. Since a root node in a spanning tree can have a plurality of subtrees, the subtrees of a root node can be represented by a second linked list of child edge objects. Another approach is to include an additional flag in each edge object of the associated linked list of edge objects, wherein the flag indicates whether the edge represented by the edge object is in the spanning tree. Since each node in a spanning tree can have at most one parent node, yet another approach includes an extra field in each vertex object to indicate the parent node in the spanning tree. In the data structure illustrated in FIG. 5, the PARENT field of vertex object 550 includes a reference 230 (or an equivalent such as a pointer) to its parent, vertex 230, in the spanning tree depicted in FIG. 3. The PARENT field of vertex object 540 indicates vertex 230 as the parent, and the PARENT fields of vertex objects 510, 520, and 530 indicate vertices 200, 200, and 220, respectively, as the parent. The PARENT field of vertex object 500 is null, since vertex 200 is the root of the spanning tree.

Finding a Minimum Leaf Spanning Tree

After the equivalent DAG is constructed, an embodiment of the present invention finds a minimum leaf spanning tree of the DAG (step 402). Although a plurality of minimum leaf spanning trees may exist for a DAG, only one minimum leaf spanning tree need be found to determine a minimal set of indexes for a given set of anticipated query types. On the other hand, it is contemplated that other embodiments of the present invention are configured to find two or more minimum leaf spanning trees of a DAG and choose one of them based on ranking criteria. For example, the net cost for using indexes indicated by leaves of a minimum leaf spanning tree can be calculated by computing selectivity factors for the anticipated queries multiplied by a cost metric for each index as disclosed in the commonly assigned, U.S. application Ser. No. 08/808,094 entitled "Index Selection for an Index Access Path" and filed on Feb. 28, 1997 by Hakan Jakobsson, Michael Depledge, Cetin Ozbutin, and Jeffrey I. Cohen (now U.S. Pat. No. 5,924,088), incorporated herein by reference.

Figure 6:
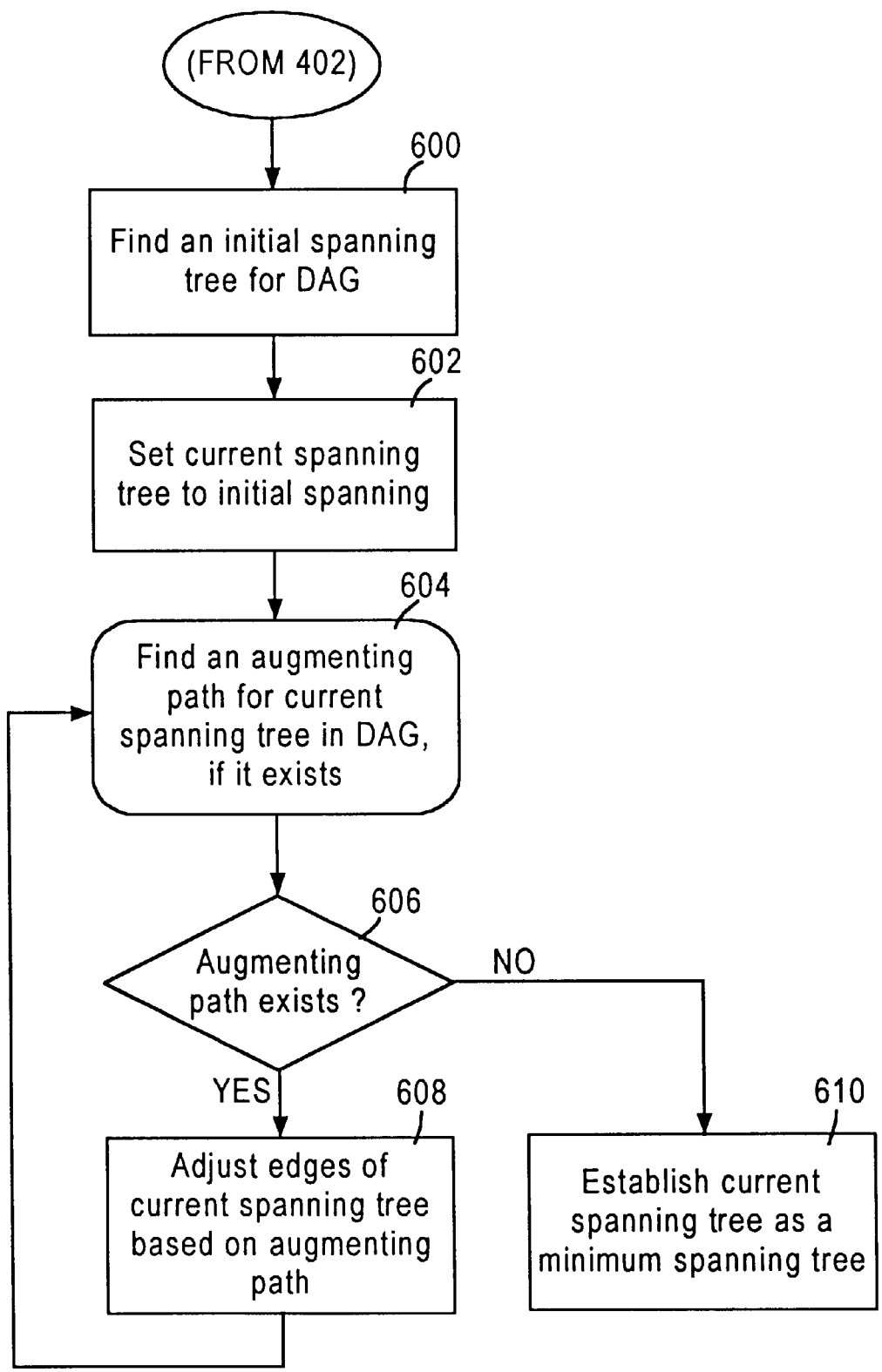
FIG. 6 is a flowchart illustrating steps of finding a minimum leaf spanning tree according to an embodiment of the present invention.

One method of finding a minimum leaf spanning tree is illustrated in FIG. 6. In step 600, in which an initial spanning tree is found for the DAG, as by conventional techniques such as a depth-first search and a breadth-first search, as described in more detail herein above. The present invention is not limited to any particular initial spanning tree or to any particular method of finding an initial spanning tree, which may vary from implementation to implementation. In the working example, one initial spanning tree is illustrated in FIG. 3 and has three leaves: node 210, node 240, and node 250.

In step 602, the initial spanning tree is established as the current spanning tree for a loop that repeatedly finds related spanning trees with fewer leaf nodes until no more are found. According to one embodiment of the present invention, such a related spanning tree is determined by finding an augmenting path for the current spanning tree in the DAG, if it exists (steps 604 and 606) and adjusting the edges of the spanning tree based on the augmenting path to produce a spanning tree with a reduced number of leaves (step 608).

Finding an Augmenting Path

In step 604, an augmenting path for the current spanning tree of the DAG is found, if it exists. One exposition of an augmenting path in a different context, viz. maximal matchings in a bipartite graph, is found in Aho, Hopcroft & Ullman, *Data Structure & Algorithms* (Reading, Mass.: Addison-Wesley, 1983). An augmenting path may be formally defined as follows: given a spanning tree T of a graph G=(V, E), an augmenting path for T is a sequence $v_0, v_1, \ldots, v_k$ of vertices from V such that:

(1) $v_0$ is a leaf of T;
(2) for $0 < j < k$ each of $v_j$ has exactly one child in T;
(3) $v_k$ has at least two children in T; and
(4) for $0 \leq i < k$, there exists a vertex $u_i$ such that (a) the edge $v_i \rightarrow u_i$ is in E but not in T and (b) the edge $v_{i+1} \rightarrow u_i$ is in T.

Figure 7A:
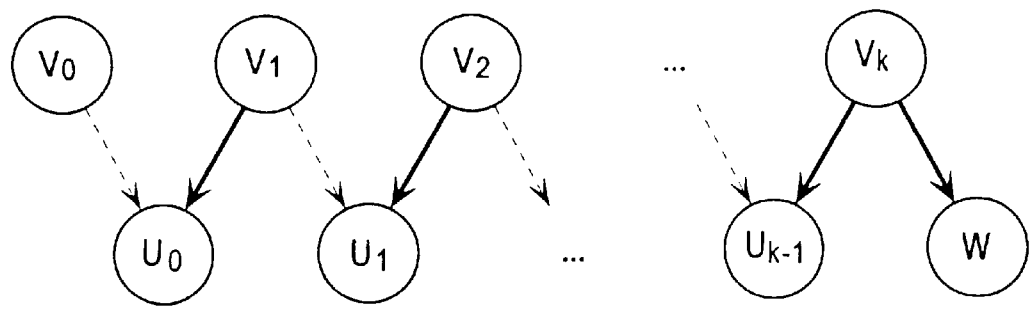
FIG. 7(*a*) illustrates an augmenting path for a spanning tree in a directed acyclic graph.

This formal definition can be visualized with reference to FIG. 7(a), which depicts a portion of a directed, acyclic graph comprising nodes $v_0, v_1, v_2, \ldots V_k, u_0, u_1, \ldots, u_{k-1}$, and w. The edges represented by solid arrows are in the spanning tree and the graph, and the edges represented by dashed arrows are in the graph but not in the spanning tree. In FIG. 7(a), node $v_0$ is a leaf node, condition (1), and nodes $v_1, v_2, \ldots, v_k$ are non-leaf nodes. Each of nodes $u_0, u_1, \ldots, u_{k-1}$, and w can be either a leaf node or a non-leaf node. Considering condition (2), each of nodes $v_1, v_2, \ldots, v_{k-1}$, has only one child in the spanning tree, indicated by a solid arrow. For condition (3), node $v_k$ has two children, node $u_{k-1}$ and node w. For each of nodes $u_0, u_1, \ldots, u_{k-1}$, the parent node to the left, marked by a dashed arrow, is not in the spanning tree, and the parent node to the right is in the spanning tree, meeting conditions (4a) and (4b) respectively.

One augmenting path for the spanning tree in the working example of FIG. 3 comprises $v_0$ as node 240 and $v_1$ as node 230, where k=1 and $u_0$ is node 250. Referring to the definition, $v_0$ (node 240) is a leaf of T, since node 240 does not have an edge in the spanning tree emanating therefrom. Condition (2) is trivially satisfied since k=1. The third condition is met since $v_1$ (node 230) has two children in the spanning tree: node 240 via edge 234 and node 250 via edge 235. Concerning condition (4), edge $v_0 \rightarrow u_0$ (edge 245 from node 240 to node 250) is not in the spanning tree, but edge $v_1 \rightarrow u_0$ (edge 235 from node 230 to node 250) is in the spanning tree.

Figure 8A:
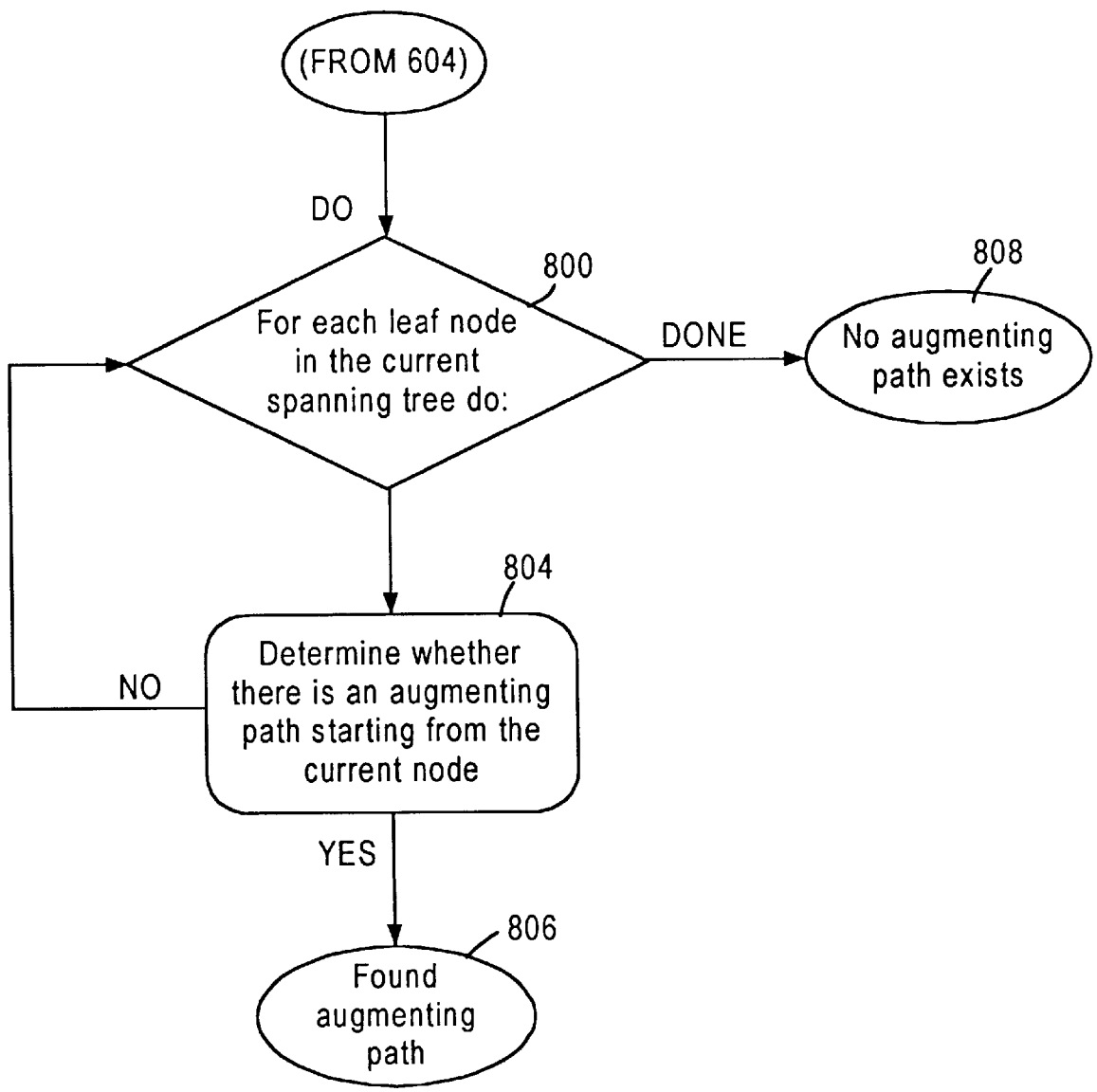
FIGS. 8(a) and 8(b) are flowcharts illustrating steps of finding an augmenting path for a spanning tree of a graph according to an embodiment of the present invention.
Figure 8B:
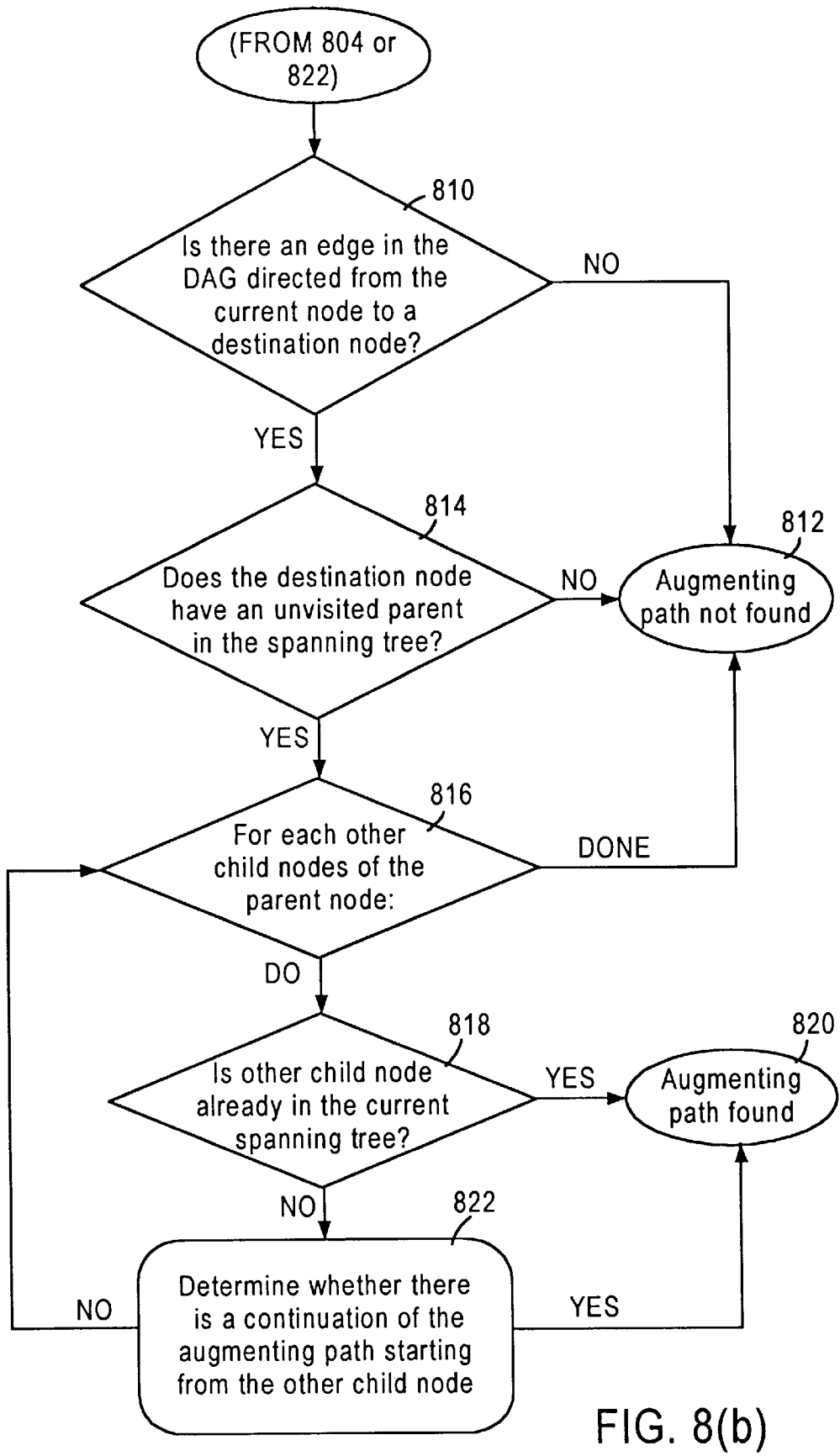

FIGS. 8(a) and 8(b) are flowcharts illustrating one method for finding an augmenting path for a spanning tree of a DAG, if it exists. Step 800 controls a loop that iterates through each leaf node in the current spanning tree until an augmenting path is found. The iteration can be performed by such techniques as a pre-order traversal of the spanning tree. If all the leaf nodes have been exhausted without finding an augmenting path (see step 806), then the loop controlled by step 800 terminates and execution passes to step 802, where the lack of an augmenting path is signaled, as by returning a "false" boolean value or equivalent.

During the execution of the loop at step 804, each leaf node under consideration is established as the current node for finding an augmenting path starting from the current node. Referring back to the definition of an augmenting path, the requirement that the start of the augmenting path be a leaf node satisfies condition (1) that $v_0$ is a leaf of T. During step 804, the DAG is search for an augmenting path that starts at the current node. In one implementation, this search is performed in a separate subroutine (e.g. a C function) whose operation is illustrated in FIG. 8(b) starting at step 810. If the result of searching for an augmenting path in step 804 is true, then the method indicated that an augmenting path has been found (step 806). Otherwise, execution loops back to step 800 where another leaf node, if available, is considered.

Referring to FIG. 8(b), in step 810, the current node is checked for an edge in the DAG that is directed from the current node. Referring back to the working example depicted in FIG. 3, leaf node 250 does not have such an edge; consequently, the "NO" branch is taken, indicating that an augmenting path is not found for the current node (step 812). If step 810 to find a particular augmenting path was called from step 804 in the main loop, then returning a not found indication causes another iteration of the loop controlled by step 800 for another leaf node, if present. With respect to leaf node 240, there is an edge directed therefrom: edge 245 directed to node 250. Accordingly, execution proceeds to step 814. Since the current node is a leaf node, any edge directed therefrom is in the DAG but not in the spanning tree. Therefore, the test in step 810 checks for condition (4a) that edge $v_i \rightarrow u_i$ is in E but not in T. In the working example, edge $v_0 \rightarrow u_0$ is edge 245, which is directed from node 240 as $v_0$ to node 250 as $u_0$, is not in the current spanning tree.

At step 814, the destination node of the edge is checked to determine whether its parent node in the spanning tree has been visited. In the working example, the parent of destination node 250 in the spanning tree is node 230, since edge 235 is in the spanning tree. On the other hand, node 200, the root of the DAG and the spanning tree, does not have a parent and, consequently, does not meet this condition Referring again to FIG. 5, it is evident that the parent of a node can be readily determined according to one embodiment of the present invention by accessing the PARENT field. More specifically, the value of the PARENT field in vertex object 550 representing node 250 refers to node 230. By finding a parent node in the spanning tree for the destination node, condition (4b) that edge $v_{i+1} \rightarrow u_i$ is in T is satisfied, since edge 235 from node 230 as $v_1$ to node 250 as $u_0$ is part of the current spanning tree.

There are at least two advantages for checking whether the parent node has been visited. One benefit is avoiding infinite loops, and another benefit is the elimination of superfluous attempts to find an augmenting path for nodes already determined not to contain an augmenting path. There is a variety of techniques for determining whether a node has been visited, but the present invention is not limited to any particular technique. For example, a separate data structure can be maintained to record which nodes have been visited. As another example, the data structure that represent vertices in the DAG can be augmented to include a MARK field to hold a Boolean flag that marks whether the corresponding node has been visited. A drawback of the Boolean flag approach is that the data structure for the DAG must be traversed each time to reset the flag for each separate pass of finding an augmenting path. Accordingly, the MARK field preferably contains a monotonically increasing (or, alternatively, decreasing) pass number that indicates the last pass in which the node was visited. Thus, determining whether a node has been visited is performed by comparing the MARK field of the node to the current pass number. If the condition in step 814 is not met, then an indication that an augmenting path is not found for the current node made (step 812); otherwise, execution proceeds to step 816. A node is considered and marked as visited when the condition in the next step 816 is met.

In step 816, the parent node of the destination node is checked for the existence of one or more other child nodes. If there is no other child node, then neither condition (3) that $v_k$ has at least two children in T nor condition (4a) that edge $v_i \rightarrow u_i$ is in E but not in T can be satisfied. Accordingly, execution proceeds to step 812 to indicate that an augmenting path is not present for the current node. In the working example, however, there is another child node for parent node 230, namely node 240 via edge 234.

If the edge to any other child node of the parent node is in the current spanning tree, checked by step 818, then condition (3) that $v_k$ has at least two children in T is satisfied and an augmenting path has been found. In the working example, since $v_1$ as node 230 has at least two children in the current spanning tree, namely node 240 and node 250, an augmenting path has been found comprising $v_0$ as node 240 and $v_1$ as node 230, where k=1 and $u_0$ is node 250. Accordingly, execution branches to step 820, where the fact that an augmenting path is found is signaled, as by returning a "true" boolean value or equivalent.

On the other hand, if the edges to the other child nodes of the parent node are not in the current spanning tree, condition (4a) that edge $v_i \rightarrow u_i$ is in E but not in T is satisfied. Condition (2) that each of $v_j$ has exactly one child in T is also satisfied, since this parent node has one child in the current spanning (determined in step 814) but no other child in the current spanning tree (determined in step 818). Consequently, the search for an augmenting path is continued using one of the other child nodes as the current node (step 822). One approach is preferably a recursive call to step 810, as a depth-first search, but other equivalent approaches, such as a search with an explicit stack or other supplementary data structure, may be employed. If the result of searching for a continuation of the augmenting path succeeds, then execution branches to step 820 where this success is signaled. On the other hand, if the result of searching for a continuation of the augmenting path does not succeed, then execution backtracks to step 816 to examine another child node, if it exists, for a potential continuation of the augmenting path. If no other child node exists, then execution reaches step 812 indicating that an augmenting path cannot be continued from the current node.

Reducing a Spanning Tree

Referring back to FIG. 6, execution proceeds to step 606, where the existence of an augmenting path possibly found in step 604 is tested. Preferably, step 604 is coded as a routine configured to perform the steps illustrated in FIG. 8 and return a value, e.g a Boolean, indicating whether an augmenting path was found by the routine. If an augmenting path was found, then execution branches to step 608, wherein the edges of the current spanning tree are adjusted based on the augmenting path to produce a new spanning tree having a fewer number of leaves. On the other hand, if no augmenting path exists, then the current spanning tree is established as a minimum spanning tree (step 610) and execution returns back to step 404.

Figure 7B:
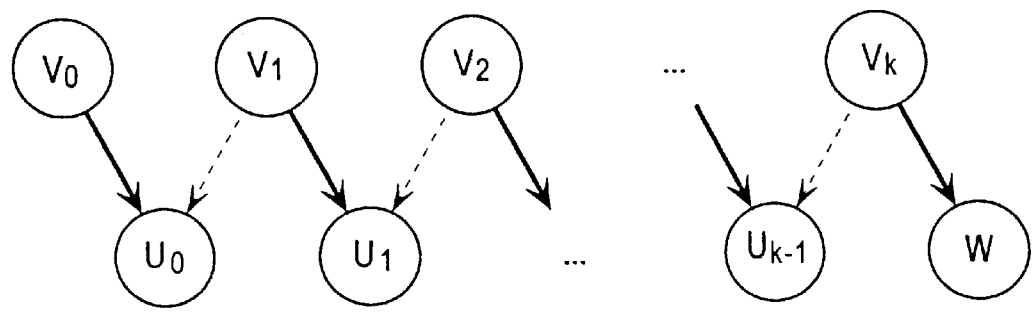

Given a spanning tree of a graph and an augmenting path for the spanning tree, a new spanning tree can be constructed based thereon having a fewer number of leaves. Referring back to FIG. 7(*a*), such a reduced leaf spanning tree is constructed by deleting all edges $v_{i+1} \rightarrow u_i$ in the augmenting path and replacing them with edges $v_i \rightarrow u_i$. Thus, the parent of $u_i$ in the spanning tree changes from $v_{i+1}$ to $v_i$. A result of this procedure is depicted in FIG. 7(*b*). By inspection, the new spanning tree has one fewer leaf than the original spanning tree, because $v_0$ changes from a leaf to a non-leaf, $v_1, v_2, \ldots, v_k$ remain non-leaf nodes, and the leaf-ness of nodes $u_0, u_1, \ldots, u_{k-1}$, and w are unaffected.

In the working example, one augmenting path was found comprising $v_0$ as leaf node 240 and $v_1$ as node 230, where k=1 and $u_0$ is node 250. Edge 245 from node 240 ($v_0$) to node 250 ($u_0$), marked as a dashed arrow, is not in the spanning tree, and edge 235 from node 230 ($v_1$) to node 250 ($u_0$), marked as a solid arrow, is in spanning tree. Accordingly, a reduced leaf spanning tree is constructed by removing edge 235 from node 230 ($v_1$) to node 250 ($u_0$) from the spanning tree and adding edge 245 from node 240

Figure 9:
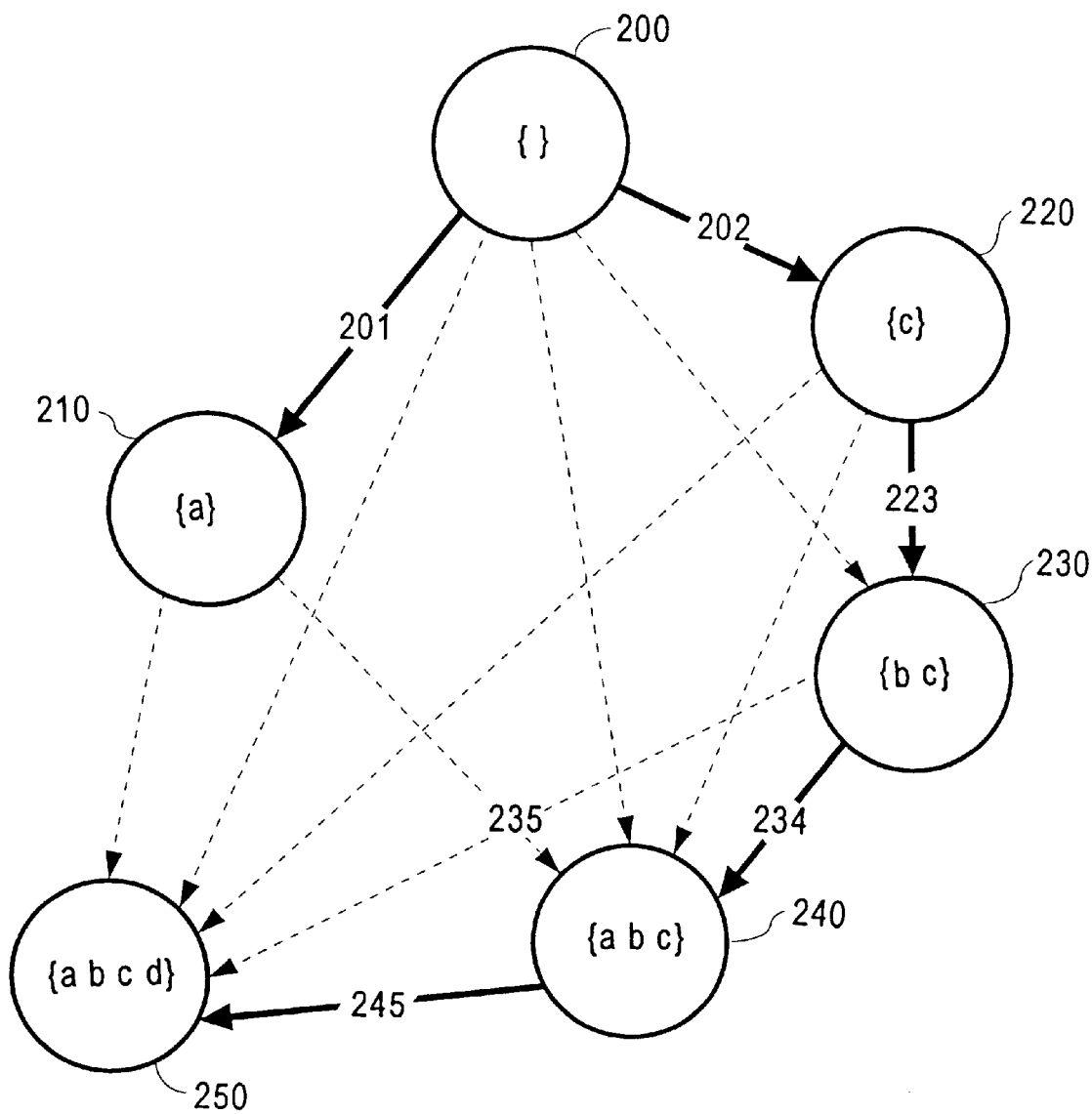
FIG. 9 depicts a minimum leaf spanning tree for the graph shown in FIG. 2.
Figures 11A, 11B:
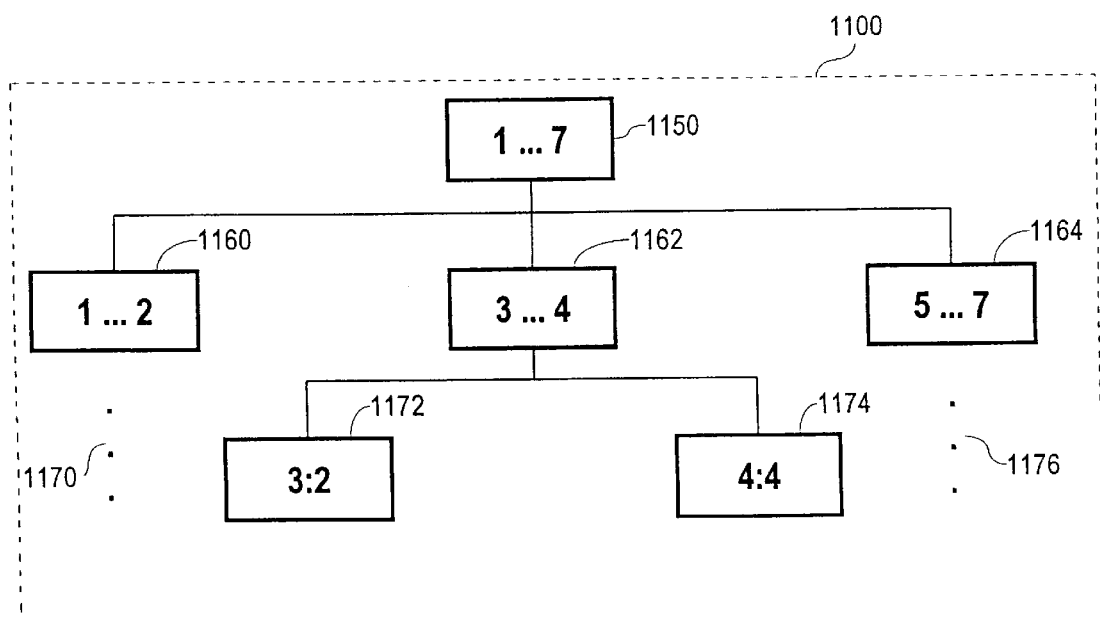
FIG. 11(a) depicts an index built upon the table shown in FIG. 10.
FIG. 11(b) illustrates a B-Tree implementation of the index shown in FIG. 11(a)

($v_0$) to node 250 ($u_0$) into the spanning tree. This reduced leaf spanning tree is illustrated in FIG. 9 and consists of only two nodes 210 and 250 are leaf nodes in the spanning tree, whereas the spanning tree depicted in FIG. 3 comprises three nodes. Edge 235 from node 230 ($v_1$) to node 250 ($u_0$) is marked with a dashed arrow and is not in the spanning tree, and edge 245 from node 240 ($v_0$) to node 250 ($u_0$) is marked with a solid arrow and is in the spanning tree. The reduction of the current spanning tree based on the augmenting path can be performed by a separate subroutine or integrated with the routine that found the augmenting path. In the latter case, the edges can be flipped in or out of the current spanning tree at step 812 by resetting the PARENT field of the vertex object representing node $u_i$ to reference node $v_i$.

With reference to FIG. 6, after adjusting the edges of a current spanning tree to produced a reduced leaf spanning tree in step 608, the reduced leaf spanning tree is established as the new current spanning tree and steps 604, 606, and 608 are repeated until an augmenting path can no longer be found. In this situation, the loop terminated and the current spanning tree is returned to step 404 as the minimum leaf spanning tree.

Building the Indexes from the Minimum Leaf Spanning Tree

As described herein above, the leaves of a spanning tree of a graph representing prefix relationships between combinations of columns correspond to a set of indexes that cover all the anticipated queries. Referring back to FIG. 4, in step 404 the indexes to be built are determined from the minimum leaf spanning tree generated within step 402. Since a minimum leaf spanning tree has a minimum number of leaves and since for any set of n indexes there is a spanning tree having at most n leaves, determining the set of indexes to be built from the minimum leaf spanning tree results in a minimum number of indexes being built, thereby reducing the costs of maintaining indexes while still efficiently handling the anticipated query types. In the working example, the minimum leaf spanning tree depicted in FIG. 9 has two leaves: node 210 representing column combination {a} and node 250 representing column combination {a, b, c, d}. Accordingly, the minimum leaf spanning tree indicates that two indexes may be built upon the corresponding column combinations in order to support all the exemplary anticipated query types. Since node 210 representing column combination {a} is a leaf node in the spanning tree, the minimum leaf spanning tree indicates that an index may be built upon column a.

Since the order of columns in a multi-column index is significant, the column combinations that form prefixes of other column combination must occur before the non-prefixed columns. Specifically, the column combinations are built in reverse order of the column combinations represented by nodes on the path from a leaf node to the root. According to one embodiment of the present invention, this ordering may be determined by traversing via the PARENT field the minimum leaf spanning from a leaf node to the root while building a stack of column combinations. Due to the LIFO (last in, first out) nature of a stack, pulling column combinations from the stack results in a proper, reverse order of column combinations. The stack need not be explicit, as described herein, because a series of recursive function calls achieve a similar result by an implicit use of a call stack. Other approaches such as lists and queues may also be adopted.

In the working example, starting from multi-column leaf node 250, column combination {a, b, c, d} is pushed on the stack, and parent node 240 is visited. At node 240, column combination {a, b, c} is pushed onto the stack so that the stack contains the following elements: ({a, b, c}, {a, b, c, d}). Subsequently, at next parent node 230, column combination {b, c} is pushed onto the stack so that the stack contains the following elements: ({b, c}, {a, b, c}, {a, b, c, d}). Subsequently, at next parent node 220, column combination {c} is pushed onto the stack so that the stack contains the following elements: ({c}, {b, c}, {a, b, c}, {a, b, c, d}). Since the parent of node 220 is the root node, the order of columns can be determined by pulling of the top elements of the stack. First, column combination {c} is pulled off the stack; thus the first column in the multi-column index is column c. The next column combination to be pulled off the stack is column combination {b, c} and the new column b is placed after column c, resulting in the order: c and b. Next, column combination {a, b, c} is pulled off the stack and new column a is added to the order of columns, resulting in the order: c, b, and a. Finally, column combination {a, b, c, d} is pulled off the stack and new column d is added to the order of columns, resulting in c, b, a, and d.

Therefore, the two indexes of the working example, a first index built on column a, and a second index built on columns c, b, a, and d, can cover the exemplary anticipated query types referencing column combinations {a}, {c}, {b, c}, {a, b, c}, and {a, b, c, d}. More specifically, a query referencing column combination {a} can use the first index built on column a. The query type referencing column combinations {c} can use the multi-column index built upon columns c, b, a, and d, because column c appears first. A query referencing columns b and c can use the multi-column index built on columns c, b, a, and d because columns c and b appear first. Similarly, the query referencing column combination {a, b, c} and the query referencing column combination {a, b, c, d} can use the multi-column index built on columns c, b, a, and d.

Subquery Snapshots

The present application may be applied to improve the efficiency of fast refresh of snapshots defined by a query containing a subquery. A snapshot is a body of data constructed of data from a "master" table. The data contained within a snapshot is defined by a query that references the master table and optionally other tables, views, or snapshots. A snapshot can be refreshed periodically or on demand by a user to reflect the current state of its corresponding base tables.

One method of refreshing a table is called "fast refresh," which transfers to the snapshot only those changes to the master table that have been made since the last refresh of the snapshot. A "master log" file can be employed to track and record the rows that have been updated in the master table. When a snapshot is refreshed, only the appropriate rows in the master log need to be applied to the snapshot table. In a networked environment, only those modified rows found at the master site are transferred across the network and updated or inserted into the snapshot. Rows deleted in the master table are also deleted in the snapshot. Fast refresh is typically faster, more efficient, and involves less network traffic than another form of refresh, called "complete refresh," in which the snapshot definition query is merely reissued.

As described in more detail in the commonly assigned U.S. application Ser. No. 08/880,928, entitled "Fast Refresh of Snapshots Containing Subqueries," filed on Jun. 23, 1997 by Alan Downing, Harry Sun, and Ashish Gupta, the contents of which are incorporated herein by reference, a fast refresh can be performed on snapshots defined by a query that includes a subquery. For example, a subquery snapshot on table T1 1000 may be defined by the following snapshot definition query:

Query 4 select * from T1 where exists (select a from T2 where T1.a=T2.a)

The nested select statement "(select a from T2 where T1.a=T2.a)" is a subquery, where table T1 1000 is a master table and table T2 is another base table. This snapshot contains all the rows of table T1 1000 in which the value of column a is also found in column a of table T2. If a row is deleted in table T2, then rows in the snapshot that depend on that row are deleted from the snapshot during a fast refresh. For this purpose, it is advantageous to have an index built on column a to efficiently drive the delete operation. A snapshot definition query can be more complex; for example, the following snapshot definition query has five different subqueries:

Query 5 select * from T1
   where exists (select a from T2 where T1.a=T2.a)
   and exists (select c from T3 where T1.c=T3.c)
   and exists (select b, c from T4 where T1.b=T4.b and T1.c=T4.c)
   and exists (select a, b, c from T5 where T1.a=T5.a and T1.b=T5.b and T1.c=T5.c)
   and exists (select a, b, c, d from T6 where T1.a=T6.a and T1.b=T6.b and T1.c=T6.c and T1.d=T6.d)

For QUERY 5, five column combinations are anticipated to be frequently referenced, namely column combinations {a}, {c}, {b, c}, {a, b, c}, and {a, b, c, d}. Although building five indexes for the respective column combinations enables efficient operation of the fast refresh, the number of indexes that are built is excessive, because the five indexes have to be updated each time a row is deleted from the snapshot. Accordingly, it is desirable to share multicolumn indexes for the column combinations if possible, thereby avoiding unnecessary index maintenance costs.

Use of the present invention to determine the minimum number of indexes to built that can cover the anticipated column combinations in the subqueries of a subquery snapshot advantageously reduces index maintenance costs by eliminating the unnecessary indexes. As described herein above with respect to the working example, one minimal set of indexes for the family of column combinations {a}, {c}, {b, c}, {a, b, c}, and {a, b, c, d} includes an index built on column a and a multi-column index built upon columns c, b, a, and d. Consequently, only two indexes need be maintained, not five indexes according to one conventional approach nor even three indexes according to a use of a depth-first search to find an initial spanning tree on an equivalent directed, acyclic graph.

In the preceding description, the term "column" has been used to refer to columns of relational database tables. However, the term more generally applies to fields into which records from a body of data are organized. For example, in object oriented environments, attributes of object classes act as columns in that they divide object data from objects that belong to the classes into fields. Thus, the present invention is not limited to use with relational tables.

In the foregoing specification, the invention has been described with reference to specific embodiments thereof. It will be apparent, however, that various modifications and changes may be made thereto without departing from the broader spirit and scope of the invention. The specification and drawings are, accordingly, to be regarded in an illustrative rather than a restrictive sense.

What is claimed is:

1. A method of creating one or more indexes for a body of data arranged in columns, said indexes used to support a plurality of query types, said query types referencing respective combinations of one or more of said columns, said method comprising the computer-implemented steps of:

building a graph based on the plurality of combinations of one or more of said columns of said body of data;

finding a minimum leaf spanning tree for the graph; and creating said one or more indexes based on the minimum leaf spanning tree.

2. The method of claim 1, wherein:

the step of building a graph includes the step of building the graph having a plurality of nodes corresponding respectively to the plurality of combinations of one or more of said columns; and the step of creating said one or more indexes includes the steps of:

selecting one or more combinations of one or more columns, said combinations of one or more columns corresponding to leaf nodes of the minimum leaf spanning tree; and creating said one or more indexes based on the one or more selected combinations of one or more columns, respectively.

3. The method of claim 2, wherein the step of building the graph having a plurality of nodes corresponding respectively to the plurality of combinations of one or more of said columns includes the step of adding an edge directed from a first node to a second node, wherein:

the first node corresponds to a first combination of one or more of said columns;

the second node corresponds to a second combination of columns; and the first combination of columns is a subset of the second combination of columns.

4. The method of claim 2, wherein the step of finding a minimum leaf spanning tree for the graph includes the computer-implemented steps of:

(a) finding an initial spanning tree for the graph;

(b) establishing the initial spanning tree as a current spanning tree;

(c) determining whether an augmenting path exists for the graph and the current spanning tree;

(d) if the augmenting path exists, then determining a new spanning tree, having fewer leaves than the current spanning tree, based on the augmenting path, the current spanning tree, and the graph and establishing the new spanning tree as the current spanning tree;

(e) repeating steps (c) and (d) until no augmenting path exists for the graph and the current spanning tree; and (f) establishing the current spanning tree as the minimum leaf spanning tree.

5. The method of claim 4, wherein the step of finding an initial spanning tree for the graph includes the step of finding the initial spanning tree by a depth-first search.

6. The method of claim 4, wherein the step of determining whether an augmenting path exists for the graph and the current spanning tree includes the steps of:

(1) establishing a leaf node in the current spanning tree as a current leaf node;

(2) determining whether an augmenting path starting from the current leaf node exists for the graph and the current spanning tree; and (3) repeating steps (1) and (2) until (3a) the augmenting path starting from the current leaf node exists or (3b) all leaf nodes in the current spanning tree have been considered.

7. The method of claim 6, wherein the step of determining whether an augmenting path starting from the current leaf node exists for the graph and the current spanning tree includes the steps of:

(i) establishing the current leaf node as a current node;

(ii) determining whether there exist a first edge in the graph but not in the current spanning tree directed from the current node to a first node and a second edge in the current spanning tree directed from a second node to the first node, wherein the second node is not already part of the augmenting path starting from the current leaf node;

(iii) if neither said first edge nor said second edge exists for the current node, then establishing that the augmenting path starting from the current leaf node does not exist;

(iv) if both said first edge and said second edge exist for the current node, then determining whether there exists a third edge in the current spanning tree directed from the second node to a third node different from the first node;

(v) if both said first edge and said second edge exist for the current node and the third edge exists, then establishing that the augmenting path starting from the current leaf node including the first node, the second node, and the third node exists;

(vi) if both said first edge and said second edge exist for the current node and the third edge does not exist, then determining whether a continuation of the augmenting path starting from the second node exists for the graph and the current spanning tree; and (vii) if the continuation of the augmenting path exists, then establishing that the augmenting path starting from the current leaf node including the first node, the second node, and the continuation of the augmenting path exists.

8. The method of claim 2, wherein the step of building the graph having a plurality of nodes corresponding respectively to the plurality of combinations of one or more of said columns includes the step of building the graph with a root node corresponding to an empty combination and a plurality of edges directed from the root node to the plurality of nodes, respectively.

9. The method of claim 1, wherein the step of building a graph based on the plurality of the combinations of one or more of said columns of said body of data includes the step of building the graph based on a snapshot definition query.

10. A method of finding a minimum leaf spanning tree for a directed acyclic graph (DAG), said method comprising the computer-implemented steps of:

(a) finding an initial spanning tree for the DAG;

(b) establishing the initial spanning tree as a current spanning tree;

(c) determining whether an augmenting path exists for the DAG and the current spanning tree;

(d) if the augmenting path exists, then determining a new spanning tree, having fewer leaves than the current spanning tree, based on the augmenting path, the current spanning tree, and the graph and establishing the new spanning tree as the current spanning tree;

(e) repeating steps (c) and (d) until no augmenting path exists for the DAG and the current spanning tree; and (f) establishing the current spanning tree as the minimum leaf spanning tree.

11. The method of claim 10, wherein the step of finding an initial spanning tree for the DAG includes the step of finding the initial spanning tree by a depth-first search.

12. The method of claim 10, wherein the step of determining whether an augmenting path exists for the DAG and the current spanning tree includes the steps of:

(1) establishing a leaf node in the current spanning tree as a current leaf node;

(2) determining whether an augmenting path starting from the current leaf node exists for the DAG and the current spanning tree; and (3) repeating steps (1) and (2) until (3a) the augmenting path starting from the current leaf node exists or (3b) all leaf nodes in the current spanning tree have been considered.

13. The method of claim 12, wherein the step of determining whether an augmenting path starting from the current leaf node exists for the DAG and the current spanning tree includes the steps of:

(i) establishing the current leaf node as a current node;

(ii) determining whether there exist a first edge in the DAG but not in the current spanning tree directed from the current node to a first node and a second edge in the current spanning tree directed from a second node to the first node, wherein the second node is not already part of the augmenting path starting from the current leaf node;

(iii) if neither said first edge nor said second edge exists for the current node, then establishing that the augmenting path starting from the current leaf node does not exist;

(iv) if both said first edge and said second edge exist for the current node, then determining whether there exists a third edge in the current spanning tree directed from the second node to a third node different from the first node;

(v) if both said first edge and said second edge exist for the current node and the third edge exists, then establishing that the augmenting path starting from the current leaf node including the first node, the second node, and the third node exists;

(vi) if both said first edge and said second edge exist for the current node and the third edge does not exist, then determining whether a continuation of the augmenting path starting from the second node exists for the DAG and the current spanning tree; and (vii) if the continuation of the augmenting path exists, then establishing that the augmenting path starting from the current leaf node including the first node, the second node, and the continuation of the augmenting path exists.

14. A computer-readable medium bearing instructions for creating one or more indexes for a body of data arranged in columns, said indexes used to support a plurality of query types, said query types referencing respective combinations of one or more of said columns, said instructions arranged to cause one or more processors to perform the steps of:

building a graph based on the plurality of combinations of one or more of said columns of said body of data;

finding a minimum leaf spanning tree for the graph; and creating said one or more indexes based on the minimum leaf spanning tree.

15. The computer-readable medium of claim 14, wherein:

the step of building a graph includes the step of building the graph having a plurality of nodes corresponding respectively to the plurality of combinations of one or more of said columns; and the step of creating said one or more indexes includes the steps of:

selecting one or more combinations of one or more columns, said combinations of one or more columns corresponding to leaf nodes of the minimum leaf spanning tree; and creating said one or more indexes based on the one or more selected combinations of one or more columns, respectively.

16. The computer-readable medium of claim 15, wherein the step of building the graph having a plurality of nodes corresponding respectively to the plurality of combinations of one or more of said columns includes the step of adding an edge directed from a first node to a second node, wherein:

the first node corresponds to a first combination of one or more of said columns;

the second node corresponds to a second combination of columns; and the first combination of columns is a subset of the second combination of columns.

17. The computer-readable medium of claim 15, wherein the step of finding a minimum leaf spanning tree for the graph includes the computer-implemented steps of:

(a) finding an initial spanning tree for the graph;

(b) establishing the initial spanning tree as a current spanning tree;

(c) determining whether an augmenting path exists for the graph and the current spanning tree;

(d) if the augmenting path exists, then determining a new spanning tree, having fewer leaves than the current spanning tree, based on the augmenting path, the current spanning tree, and the graph and establishing the new spanning tree as the current spanning tree;

(e) repeating steps (c) and (d) until no augmenting path exists for the graph and the current spanning tree; and (f) establishing the current spanning tree as the minimum leaf spanning tree.

18. The computer-readable medium of claim 17, wherein the step of finding an initial spanning tree for the graph includes the step of finding the initial spanning tree by a depth-first search.

19. The computer-readable medium of claim 17, wherein the step of determining whether an augmenting path exists for the graph and the current spanning tree includes the steps of:

(1) establishing a leaf node in the current spanning tree as a current leaf node;

(2) determining whether an augmenting path starting from the current leaf node exists for the graph and the current spanning tree; and (3) repeating steps (1) and (2) until (3a) the augmenting path starting from the current leaf node exists or (3b) all leaf nodes in the current spanning tree have been considered.

20. The computer-readable medium of claim 19, wherein the step of determining whether an augmenting path starting from the current leaf node exists for the graph and the current spanning tree includes the steps of:

(i) establishing the current leaf node as a current node;

(ii) determining whether there exist a first edge in the graph but not in the current spanning tree directed from the current node to a first node and a second edge in the current spanning tree directed from a second node to the first node, wherein the second node is not already part of the augmenting path starting from the current leaf node;

(iii) if neither said first edge nor said second edge exists for the current node, then establishing that the augmenting path starting from the current leaf node does not exist;

(iv) if both said first edge and said second edge exist for the current node, then determining whether there exists a third edge in the current spanning tree directed from the second node to a third node different from the first node;

(v) if both said first edge and said second edge exist for the current node and the third edge exists, then establishing that the augmenting path starting from the current leaf node including the first node, the second node, and the third node exists;

(vi) if both said first edge and said second edge exist for the current node and the third edge does not exist, then determining whether a continuation of the augmenting path starting from the second node exists for the graph and the current spanning tree; and (vii) if the continuation of the augmenting path exists, then establishing that the augmenting path starting from the current leaf node including the first node, the second node, and the continuation of the augmenting path exists.

21. The computer-readable medium of claim 15, wherein the step of building the graph having a plurality of nodes corresponding respectively to the plurality of combinations of one or more of said columns includes the step of building the graph with a root node corresponding to an empty combination and a plurality of edges directed from the root node to the plurality of nodes, respectively.

22. The computer-readable medium of claim 14, wherein the step of building a graph based on the plurality of the combinations of one or more of said columns of said body of data includes the step of building the graph based on a snapshot definition query.

23. A computer-readable medium bearing instructions for finding a minimum leaf spanning tree for a directed acyclic graph (DAG), said instructions arranged to cause one or more processors to perform the steps of:

(a) finding an initial spanning tree for the DAG;

(b) establishing the initial spanning tree as a current spanning tree;

(c) determining whether an augmenting path exists for the DAG and the current spanning tree;

(d) if the augmenting path exists, then determining a new spanning tree, having fewer leaves than the current spanning tree, based on the augmenting path, the current spanning tree, and the graph and establishing the new spanning tree as the current spanning tree;

(e) repeating steps (c) and (d) until no augmenting path exists for the DAG and the current spanning tree; and (f) establishing the current spanning tree as the minimum leaf spanning tree.

24. The computer-readable medium of claim 23, wherein the step of finding an initial spanning tree for the DAG includes the step of finding the initial spanning tree by a depth-first search.

25. The computer-readable medium of claim 23, wherein the step of determining whether an augmenting path exists for the DAG and the current spanning tree includes the steps of:

(1) establishing a leaf node in the current spanning tree as a current leaf node;

(2) determining whether an augmenting path starting from the current leaf node exists for the DAG and the current spanning tree; and (3) repeating steps (1) and (2) until (3a) the augmenting path starting from the current leaf node exists or (3b) all leaf nodes in the current spanning tree have been considered.

26. The computer-readable medium of claim 25, wherein the step of determining whether an augmenting path starting from the current leaf node exists for the DAG and the current spanning tree includes the steps of:

(i) establishing the current leaf node as a current node;

(ii) determining whether there exist a first edge in the DAG but not in the current spanning tree directed from the current node to a first node and a second edge in the current spanning tree directed from a second node to the first node, wherein the second node is not already part of the augmenting path starting from the current leaf node;

(iii) if neither said first edge nor said second edge exists for the current node, then establishing that the augmenting path starting from the current leaf node does not exist;

(iv) if both said first edge and said second edge exist for the current node, then determining whether there exists a third edge in the current spanning tree directed from the second node to a third node different from the first node;

(v) if both said first edge and said second edge exist for the current node and the third edge exists, then establishing that the augmenting path starting from the current leaf node including the first node, the second node, and the third node exists;

(vi) if both said first edge and said second edge exist for the current node and the third edge does not exist, then determining whether a continuation of the augmenting path starting from the second node exists for the DAG and the current spanning tree; and (vii) if the continuation of the augmenting path exists, then establishing that the augmenting path starting from the current leaf node including the first node, the second node, and the continuation of the augmenting path exists.

* * * * *